3,024,270
4-ACYLOXY-2'-HYDROXYBENZOPHENONE
Carl B. Havens and Gerald A. Clark, Midland, Mich., assignors to The Dow Chemical Company, Midland, Mich., a corporation of Delaware
No Drawing. Filed Dec. 12, 1958, Ser. No. 779,824
3 Claims. (Cl. 260—476)

This invention relates to new organic compounds and to polymeric compositions containing the same. More particularly, it relates to new organic compounds finding utility as light stabilizers for haloethylene polymers.

This application is a continuation-in-part of U.S. Serial No. 562,923, filed February 2, 1956, now abandoned.

Haloethylene polymers, such as those containing at least 50 percent vinylidene chloride, are known to be highly sensitive to the effects of elevated temperatures and of light and under prolonged exposure to heat and light may become so degraded as to be commercially useless. It has been common practice to blend certain compounds with the polymer to stabilize it against the degradative effects of heat and light.

Several of such compounds, however, are colored materials which impart an objectionable initial color to the stabilized composition which prevents the production of a commercially saleable white composition.

Still other disadvantages of many of the previous compounds are a high odor level and volatility. Obviously any odor in the stabilizer will be transferred to the stabilized composition. When volatile stabilizers are employed the stabilizers volatilize out of the composition leaving the composition in time unprotected against the degradative effects of light, particularly ultraviolet light. In addition, all of the compounds vary in their ability to absorb ultraviolet light and it is impossible to predict the effectiveness of any particular compound with any degree of certainty, and even then some of the compounds lose some of their effectiveness for absorbing ultraviolet light over a prolonged period of time.

In view of the above problems it would be desirable and it is the principal object of this invention to provide a new group of organic compounds having the stated utility.

It is a further object to provide a polymeric composition stabilized against the degradative effects of light by means of such compounds.

It is a still further object to provide a group of such compounds which have little or no color and have a low odor level.

Another object is to provide a group of such compounds which have low volatility.

The above and related objects are accomplished by means of a group of compounds having the general formula:

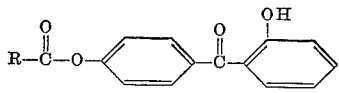

wherein R is selected from the group consisting of alkyl containing from 1 to 7 carbon atoms, phenyl, and chlorophenyl. The objects are also realized with compositions containing such compounds together with haloethylene polymers.

The compounds are easily prepared by an esterification reaction between 2,4-dihydroxybenzophenone and the appropriate acid chloride. In a typical example 2,4'-dihydroxybenzophenone was dissolved in dilute aqueous caustic in equimolar amounts. An equimolar amount of 2-chlorobenzoyl chloride was added slowly and the mixture stirred for 45 minutes. The ester was filtered and recrystallized from alcohol. The product was in the form of off-white crystals and melted at 108° to 110.5° C. A crude product consisting principally of the corresponding ester of 2-ethyl hexoic acid was found to be a pale yellow viscous liquid boiling at 180°–215° C. at one millimeter of mercury. The ester of acetic acid was a pale yellow solid having a melting point of 75°–76° C.

The compounds were found to be effective stabilizers for haloethylene polymers, particularly those polymers containing at least 50 percent vinylidene chloride. Such polymers are known to be especially sensitive to the effects of light. The compounds were found to be effective when employed in amounts of from 0.25 to 4 percent by weight based on the weight of the polymer.

The compounds may be used in polymer compositions containing the common additives such as pigments, fillers, heat stabilizers and plasticizers. They likewise may be used in conjunction with other known light stabilizers, such as salol.

EXAMPLE 1

A series of samples was prepared from a basic formulation consisting of a polymer prepared from 85 percent vinylidene chloride and 15 percent vinyl chloride together with 0.2 percent citric acid, 0.05 percent maleic anhydride, 0.4 percent disodium phosphate, and 7 percent tributyl aconitate, all percentages being by weight based on the weight of the polymer. To each sample except one was added an amount of a light stabilizer. One sample was left as a blank. The compounds of this invention were compared with salol and 2-hydroxy-5-chlorobenzophenone which are known to be effective light stabilizers for haloethylene polymers. Each sample was extruded into a 0.005 inch monofilament. The monofilaments were then exposed to sunlight in the State of Arizona for 900 ultraviolet sun hours. The monofilaments were examined periodically and their color rated according to an arbitrary color scale wherein 0 means no darkening, 3 means slight yellowing, 6 means light brown, 9 means brown, 12 means dark brown, and 15 means black. The results are listed in Table I.

Table I

| Stabilizer | Percentage | Original color | Color after exposure in hours | | |
|---|---|---|---|---|---|
| | | | 375 | 750 | 900 |
| None | | White | 1 | 14 | 15 |
| Salol | 4 | do | 1 | 8 | 9 |
| 2-hydroxy-5-chlorobenzophenone | 2 | Yellow | 1 | 3 | 8 |
| 4-salicyloxyphenyl-2-chlorobenzoate | 1 | Off-white | 0 | 2 | 3 |

The results show the compound of this invention to be an even more effective light stabilizer than the prior known compounds. The same effectiveness was observed when the chlorobenzoate above was replaced with the benzoate derivative.

EXAMPLE 2

Samples were prepared from a formulation consisting of a copolymer prepared from 85 percent vinylidene chloride and 15 percent vinyl chloride, together with 1 percent by weight of tetrasodium pyrophosphate and 7 percent by weight of acetyl triethyl citrate. One of the samples was left blank; to another was added one percent of 4-salicyloxyphenyl-2-ethylhexoate and to the third was added one percent of 4-salicyloxyphenyl acetate. The samples were compression molded into molding 0.01 inch in thickness. The moldings were then exposed to direct sunlight in the State of Florida for 3 months. The color of the moldings was examined after 1 month of exposure and again after 3 months of exposure. The results are listed in Table II.

*Table II*

| Stabilizer | Original color | Color after exposure | |
|---|---|---|---|
| | | 1 month | 3 months |
| None | Colorless | Brown | Dark brown. |
| 4-salicyloxyphenyl-2-ethyl-hexoate. | Sl. yellow | Sl. tan | Tan. |
| 4-salicyloxyphenyl acetate | ---do--------- | ---do----- | Do. |

Similarly advantageous results were obtained when the 4-salicyloxyphenyl esters of butyric acid and benzoic acid were employed.

We claim:
1. As a new organic compound, an ester having the formula:

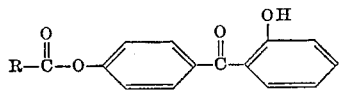

wherein R is selected from the group consisting of alkyl having from 1 to 7 carbon atoms, phenyl and chlorophenyl.

2. A new compound having the formula

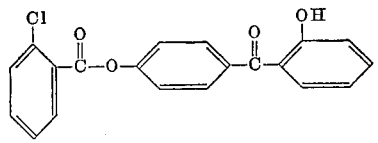

characterized by being a white solid and having a melting point of 108°–110.5° C.

3. A new compound having the formula

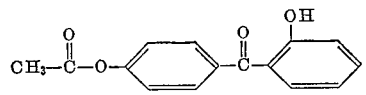

characterized by being a pale yellow solid and having a melting point of 75°–76° C.

References Cited in the file of this patent
UNITED STATES PATENTS

| | | |
|---|---|---|
| 2,264,291 | Boyer et al. | Dec. 2, 1941 |
| 2,353,684 | Mischer et al. | July 18, 1944 |
| 2,392,361 | Britton et al. | Jan. 8, 1946 |
| 2,748,160 | Reynolds et al. | May 29, 1956 |

OTHER REFERENCES

Micheal: J.A.C.S., vol. 5, pp. 86–7 (1883).
Omdorff et al.: J.A.C.S., vol. 46, pp. 2488–9 (1924).
Gomberg: J.A.C.S., vol. 47, pp. 209–10 (1925).
Tasaki: Chem. Zentralblatt, II, pp. 1354–6 (1925).